(12) United States Patent
Patrick

(10) Patent No.: US 8,926,261 B2
(45) Date of Patent: Jan. 6, 2015

(54) TURBINE ASSEMBLY

(75) Inventor: David Michael Patrick, Irvine, CA (US)

(73) Assignee: 4sphere LLC, Playa del Rey, CA (US)

( * ) Notice: Subject to any disclaimer, the term of this patent is extended or adjusted under 35 U.S.C. 154(b) by 477 days.

(21) Appl. No.: 13/450,383

(22) Filed: Apr. 18, 2012

(65) Prior Publication Data

US 2013/0280057 A1 Oct. 24, 2013

(51) Int. Cl.
*F03D 7/00* (2006.01)
*F01D 1/06* (2006.01)
*F03D 5/00* (2006.01)

(52) U.S. Cl.
CPC .. *F01D 1/06* (2013.01); *F03D 5/00* (2013.01); *F05B 2210/16* (2013.01); *Y02E 10/70* (2013.01)
USPC .................. 415/4.2; 415/71; 415/76; 415/90; 416/227 R; 416/231 R

(58) Field of Classification Search
CPC ............ F05B 2210/16; F05B 2250/18; F05B 2250/183; F05B 2240/212; F05B 2240/213; F03D 3/007; F03D 5/005; F01D 1/06
USPC ..................... 415/4.2, 4.4, 71, 72, 73, 76, 90; 416/176, 177, 227 R, 277 A, 231 R; D13/115
See application file for complete search history.

(56) References Cited

U.S. PATENT DOCUMENTS

| | | |
|---|---|---|
| 3,941,504 A | 3/1976 | Snarbach |
| 3,942,909 A | 3/1976 | Yengst |
| 3,976,396 A | 8/1976 | Antogini |
| 4,012,163 A | 3/1977 | Baumgartner et al. |
| 4,115,032 A | 9/1978 | Lange |
| 4,642,036 A * | 2/1987 | Young .......................... 417/353 |
| 5,203,672 A | 4/1993 | Wolf |
| 5,246,342 A | 9/1993 | Bergstein |
| 5,375,324 A | 12/1994 | Wallace et al. |
| 5,405,246 A | 4/1995 | Goldberg |
| 5,503,530 A | 4/1996 | Walters |
| 5,934,877 A | 8/1999 | Harman |
| 7,329,965 B2 | 2/2008 | Roberts et al. |
| D587,195 S * | 2/2009 | van Wijck .................... D13/115 |
| 7,686,583 B2 | 3/2010 | Siegel |
| 7,874,787 B2 | 1/2011 | Morris |
| 7,893,556 B1 | 2/2011 | Ryznic et al. |
| 7,896,609 B2 | 3/2011 | Mitchell et al. |
| 7,980,825 B2 | 7/2011 | Vanderhye et al. |
| 2003/0209912 A1 | 11/2003 | Badger |
| 2005/0106023 A1 | 5/2005 | Palley |
| 2005/0169742 A1* | 8/2005 | Kane .............................. 415/4.4 |
| 2005/0286996 A1 | 12/2005 | Tsai |

(Continued)

FOREIGN PATENT DOCUMENTS

| | | |
|---|---|---|
| WO | WO-0136819 | 5/2001 |
| WO | WO-2005108783 | 11/2005 |

(Continued)

*Primary Examiner* — Dwayne J White
(74) *Attorney, Agent, or Firm* — Tsircou Law, P.C.

(57) ABSTRACT

A turbine assembly is provided assembly having rotor defines a plurality of recesses disposed about an axis of rotation (Ar). Each of the recesses having a wide end and a narrow end. The recesses are disposed in the alternating orientations such that the wide ends and the narrow ends of the adjacent recesses are proximate to one another to minimize wake turbulence, thereby optimizing efficiency.

16 Claims, 11 Drawing Sheets

(56) References Cited

U.S. PATENT DOCUMENTS

| | | |
|---|---|---|
| 2006/0153682 A1 | 7/2006 | Vanderhye et al. |
| 2006/0257240 A1 | 11/2006 | Naskali et al. |
| 2008/0131281 A1 | 6/2008 | Kariya |
| 2008/0273977 A1 | 11/2008 | Beard |
| 2009/0096213 A1 | 4/2009 | Berglund |
| 2009/0236858 A1 | 9/2009 | Johnson |
| 2009/0285689 A1 | 11/2009 | Hall et al. |
| 2009/0317251 A1 | 12/2009 | Tsou |
| 2009/0317255 A1 | 12/2009 | Bertony |
| 2010/0196144 A1 | 8/2010 | Morris |
| 2010/0196153 A1 | 8/2010 | DeRuyter et al. |
| 2010/0295316 A1 | 11/2010 | Grassman |
| 2011/0027087 A1 | 2/2011 | Rokeby-Thomas |
| 2011/0027089 A1 | 2/2011 | Scarpelli |
| 2011/0121578 A1 | 5/2011 | Ferguson |
| 2011/0164977 A1 | 7/2011 | Vallejo |
| 2011/0206526 A1 | 8/2011 | Roberts |
| 2012/0119500 A1* | 5/2012 | Christopher ............. 290/54 |

FOREIGN PATENT DOCUMENTS

| | | |
|---|---|---|
| WO | WO-2006132923 A3 | 4/2009 |
| WO | WO-2009117131 | 9/2009 |
| WO | WO-2011150171 | 12/2011 |
| WO | WO-2012032038 | 3/2012 |
| WO | WO-2012032075 | 3/2012 |

* cited by examiner

TURBINE ASSEMBLY

FIELD OF THE INVENTION

The present invention relates generally to turbine assemblies and, more particularly, to rotor configurations for turbine assemblies.

BACKGROUND OF THE INVENTION

Wind turbines are generally classified by the orientation of the rotor shaft with the axis of rotation, namely, horizontal axis wind turbines (HAWT) and vertical axis wind turbines (VAWT). For HAWTs, the main rotor shaft is set horizontally to generally align with the prevailing wind. For VAWTs, the main rotor shaft is set vertically, transverse to the prevailing wind direction. Both HAWTs and VAWTs convert the force of wind into torque of the rotating shaft.

VAWT has several advantages such as having the generator closer to the ground, easily accept changes in wind direction, and lower susceptibility to cross winds.

However, shortfalls exist with VAWTs, such as low wind efficiency and dynamic stability problems. In addition, pulsatory torque that is produced during each revolution leads to blade fatigue and may result in blades being flexed or cracked. Over time, blades may break apart and lead to catastrophic failure. Generally, current VAWTs have proven less reliable that HAWTs, particularly in this regard. In addition, VAWTs often times require relatively substantial wind as to initiate rotation of the rotor.

Moreover, current wind turbines (whether VAWTs or HAWTs) exhibit shortfalls that inhibit performance and cost effective power generation. Oftentimes, such turbines must be sized as massive structures have large rotors for large-scale power generation, requiring large moving parts to capture the wind. Such structures are ineffective in low wind environments.

It should therefore be appreciated that there remains a need for a turbine assembly that addresses these shortcomings. The present invention fulfills this need and others.

SUMMARY OF THE INVENTION

Briefly, and in general terms, the invention provides a turbine assembly having rotor defines a plurality of recesses disposed about an axis of rotation (Ar). Each of the recesses having a wide end and a narrow end. The recesses are disposed in the alternating orientations such that the wide ends and the narrow ends of the adjacent recesses are proximate to one another to minimize wake turbulence, thereby optimizing efficiency.

More specifically, by example and not limitation, the recesses can have an exponential taper, e.g., such that equidistant cross-sections each has a diameter that increases by a prescribed factor relative to the preceding cross-section. The prescribed factor can be the golden ratio.

In an exemplary embodiment in accordance with the invention, a focusing assembly can be provided to direct a concentrated air stream to a target region of the rotor to cause the rotor to rotate or electrical generation. The focusing assembly further including a shield disposed about the rotor to inhibit airflow to undesirable portions of the rotor.

In another exemplary embodiment in accordance with the invention, the target region is preferably confined to an exposed half (½) of the rotor to induce rotation of the rotor, more preferably the target region is an exposed quarter (¼) of the surface area of the rotor. In selected embodiments, the target region on the rotor is preferably confined to a small region about the peripheral equatorial region of the body of the rotor.

Turbines and rotor designs in accordance with the invention can be used in various applications to include hydroelectric power generation or fluid pumps. In addition, turbines can be positioned in various areas to take advantage of airflow to include, mounted on a vehicle at strategic locations for exposed to aerodynamic flow.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE EXEMPLARY EMBODIMENTS

Figure 1:
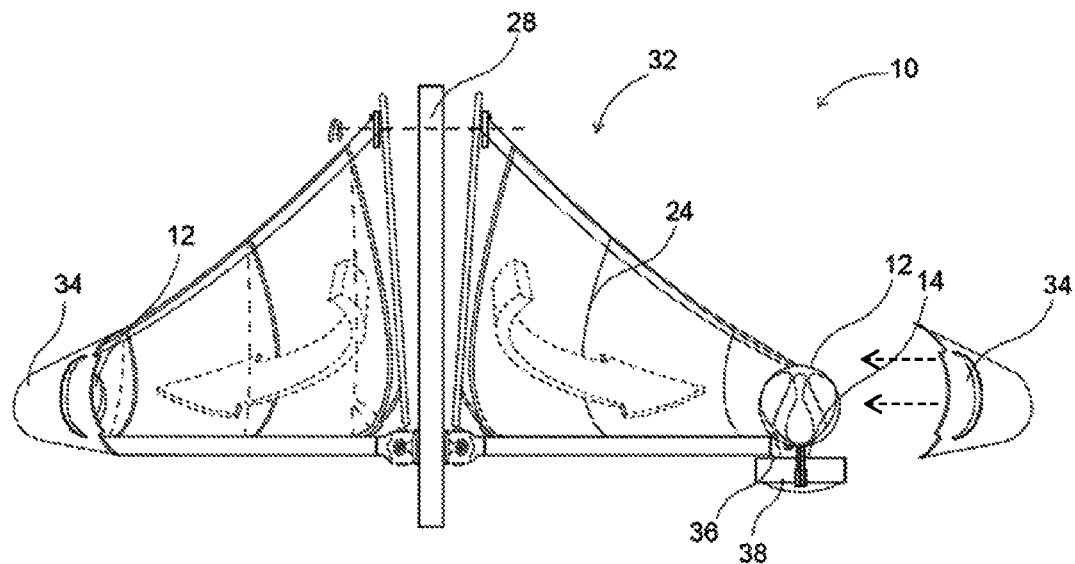
FIG. 1 is a perspective view of a pair of wind turbine assemblies in accordance with the invention, depicting dual sails directing wind flow to the two spaced-apart turbine assemblies.
Figure 2:
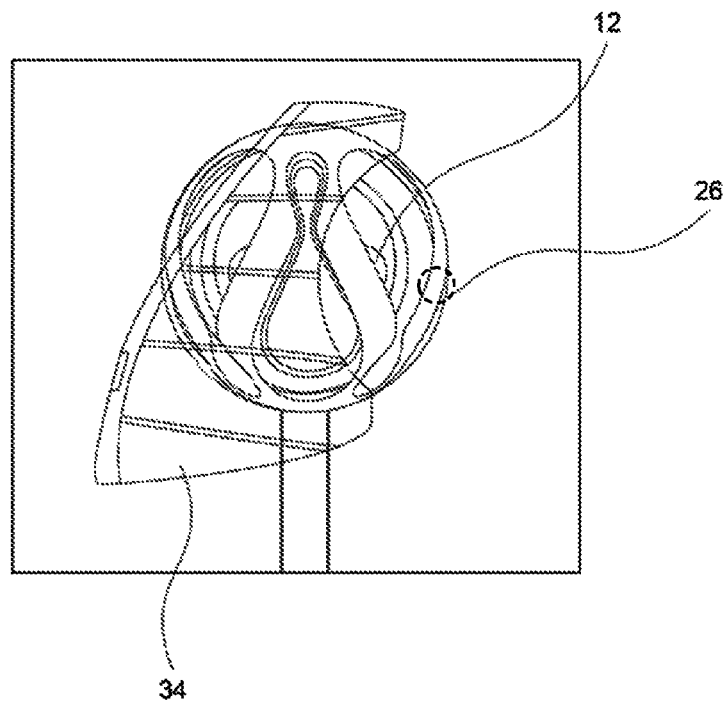
FIG. 2 is a perspective view of the first turbine assembly of the pair of turbines depicted in FIG. 1.

Referring now to the drawings, and particularly FIGS. 1-4, there is shown a turbine assembly 10 that is used to generate power from wind. The turbine assembly includes a rotor 12 mounted to a vertical turbine shaft 14, for electrical generation. More particularly, the rotor defines a plurality of tapered recesses (which are also referred to as inlays) disposed about an axis of rotation (Ar), in alternating orientations to minimize wake turbulence, thereby optimizing efficiency.

Figure 3:
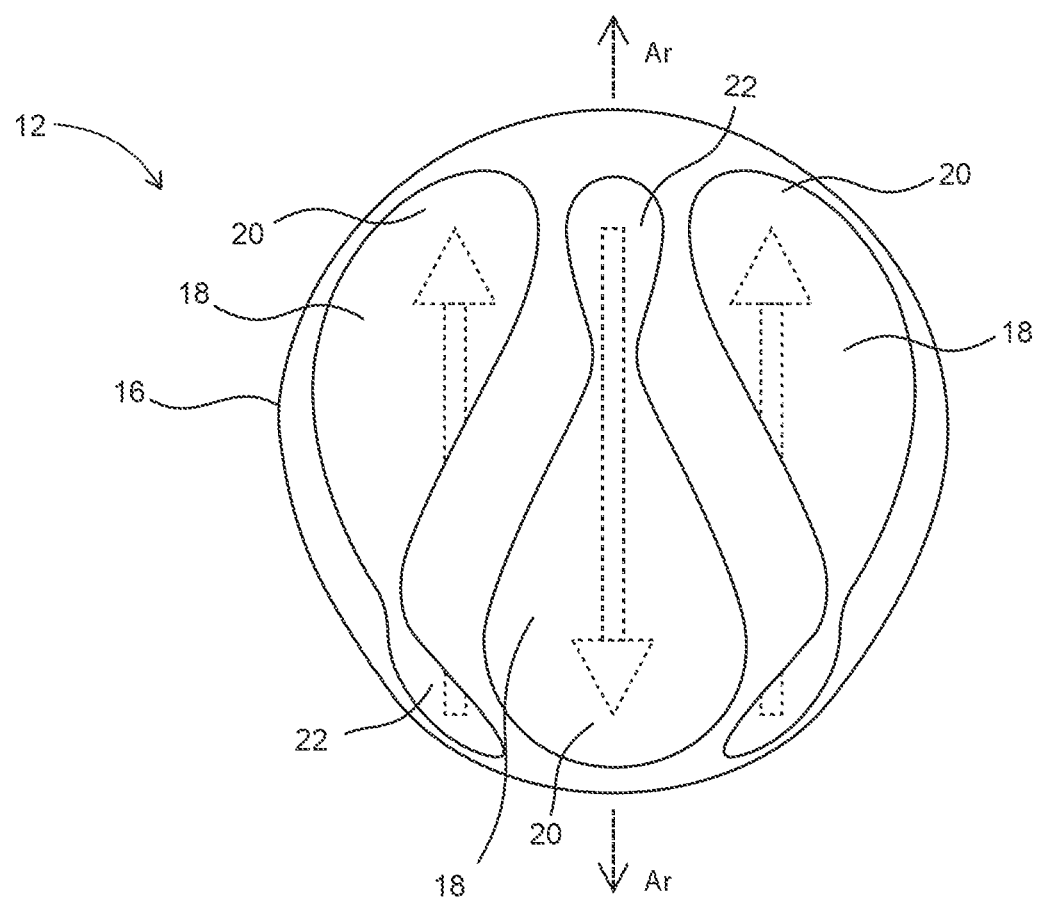
FIG. 3 is an elevational view of a rotor of a turbine assembly depicted in FIG. 1.
Figure 4:
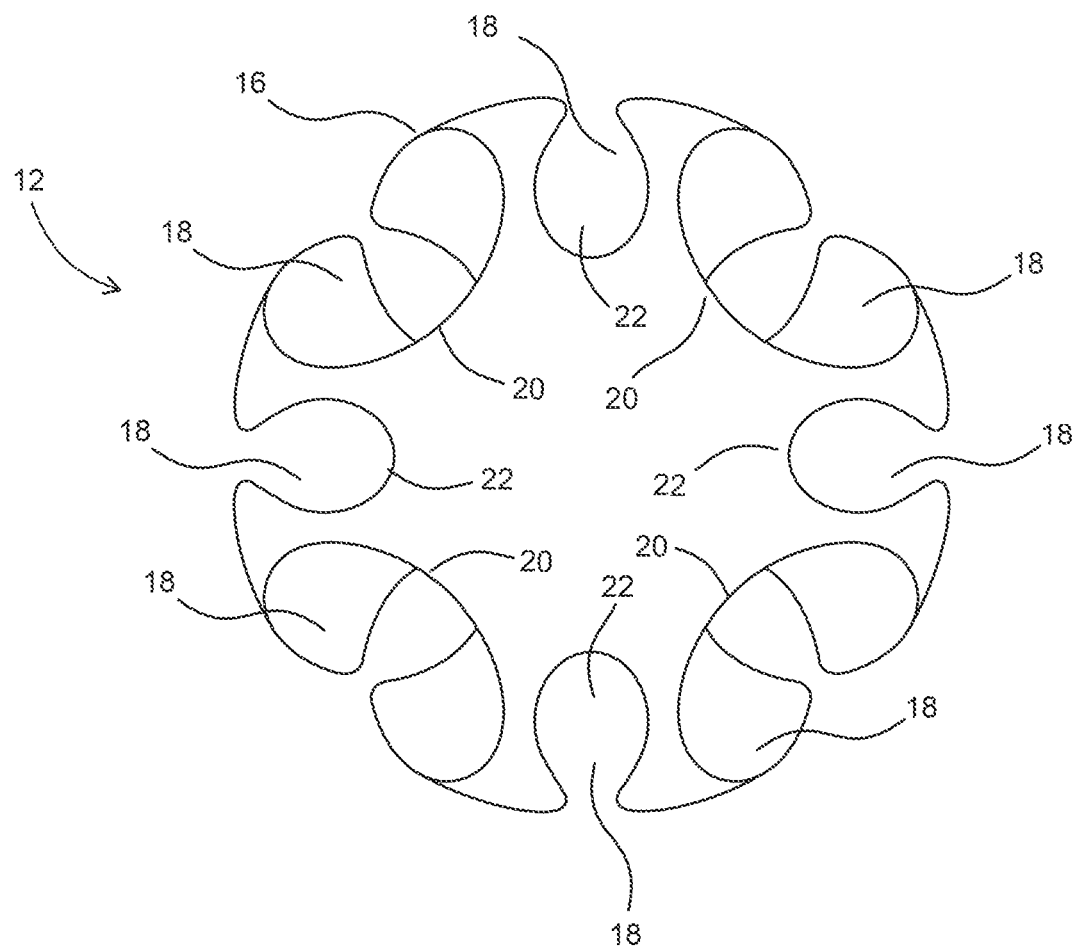
FIG. 4 is a top view of the rotor depicted in FIG. 3.

As best seen in FIGS. 3 and 4, the rotor 12 includes a spheroid body 16 that defines frusto-conic recesses 18 disposed about the perimeter of the body. Each of the recesses tapers from wide end 20 to a narrow end 22. In the exemplary embodiment, each of the recesses includes a central axis generally aligned with the axis of rotation of the rotor. As best seen in FIG. 4, adjacent recesses are disposed in alternating orientations such that a wide end 20 of the first recess is positioned adjacent to a narrow end 22 of the second recess. The alternating configuration of the recesses aids in facilitating turbine performance and efficiency by, among other things, minimizing wake turbulence and related to action of the rotor. More particularly, as wind strikes the rotor, the resulting wake will tend to exit each of the recesses via a wide end, resulting in an alternating wake.

Figure 7:
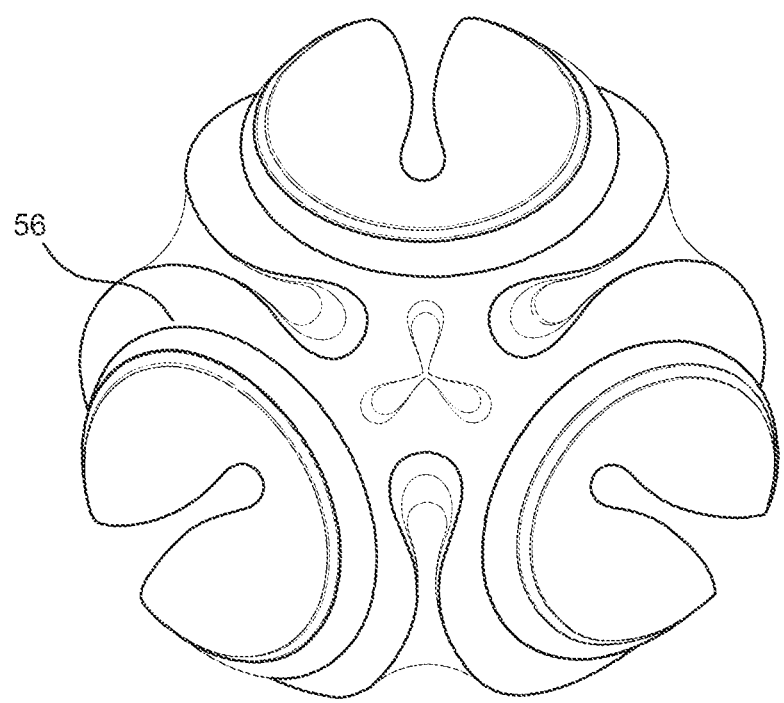
FIG. 7 is a top perspective view of another embodiment of a rotor for a turbine assembly in accordance with the invention.

The rotor 12 includes eight recesses 18 spaced in an equidistant manner about the periphery of the body 16. In other embodiments, the number of recesses can vary as design considerations dictate, such as rotor size, anticipated wind load among other things. FIG. 7 depicts another embodiment of a rotor 56 having six recesses spaced in an equidistant manner about the periphery of the rotor body.

Figure 5:
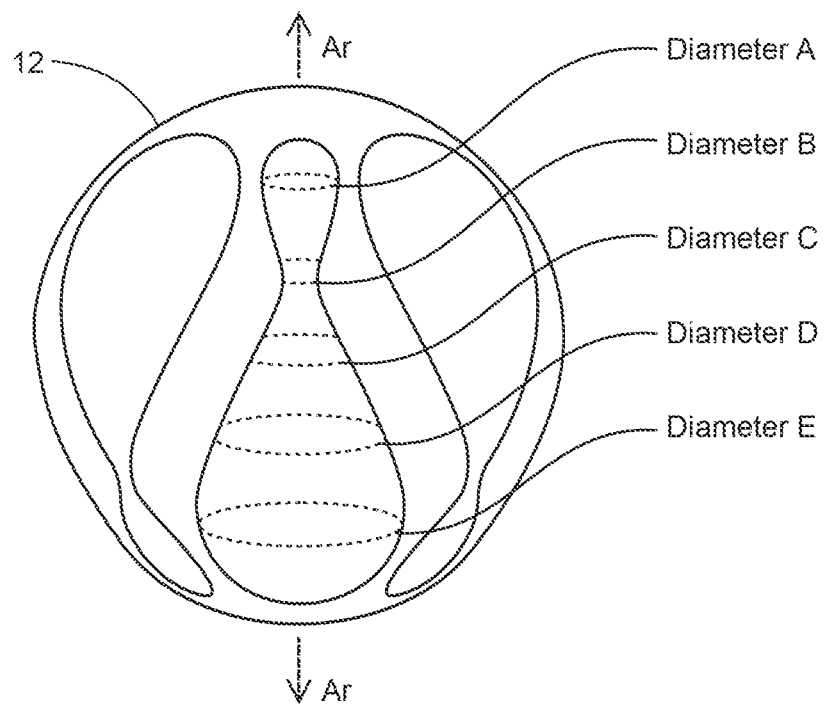
FIG. 5 is an elevational view of a rotor of a turbine assembly depicted in FIG. 1, depicting cross sections A-E taken spaced equidistant from corresponding adjacent cross sections.
Figure 6:
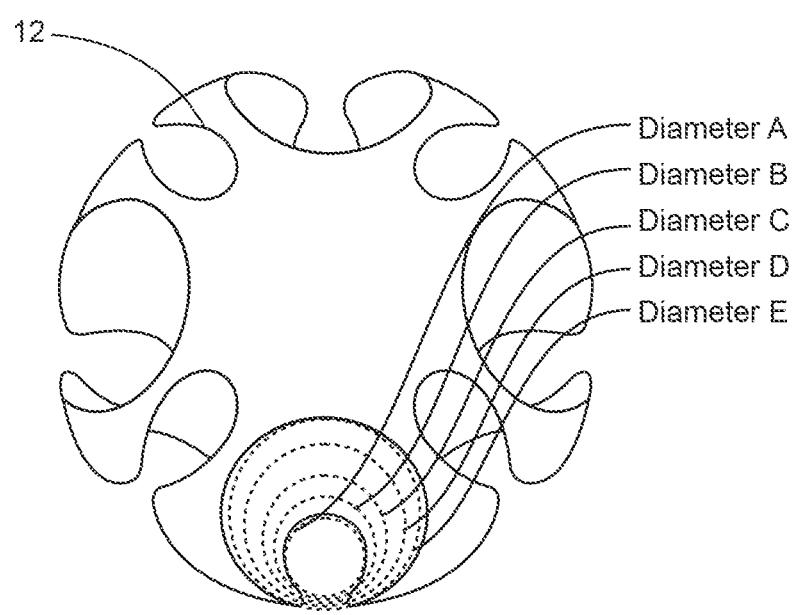
FIG. 6 is a bottom perspective view of a rotor of a turbine assembly depicted in FIG. 1, depicting cross sections A-E taken spaced equidistant from corresponding adjacent cross sections

As best seen in FIGS. 5 and 6, the recesses 18 have a generally frusto-conic shape that has an exponential taper (aka, exponentially flared), based upon the "golden ratio" ($\Phi \approx 1.6180339887\ldots$). Cross sections A, B, C, D, and E are each spaced X distance from adjacent cross sections. The diameter of each cross section increases by a factor of $\Phi$, e.g., diameter of cross section B equals $\Phi$ times diameter of cross section A ($B_{dia}=\Phi \times A_{dia}$), and diameter of cross section C equals $\Phi$ times diameter of cross section B ($C_{dia}=\Phi \times B_{dia}=\Phi^2 \times A_{dia}$), and so on.

In other embodiments, various other configurations can be provided for the recesses without departing from the invention. For example, recesses disposed in alternating configurations can be providing having a wide end and a narrow end, to including where one or more of the ends are closed. In addition, various other taper configurations can be provided to the recesses to include tapers having constant slope, stepped slope, curved slopes, or other configurations of recesses can be provided.

With reference again to FIG. 1, the shaft 14 is coupled to a power transfer assembly, transmission box 36, configured as a slip ring transfer transmission, to drive an electrical generator 38. In other embodiments, various other transmissions can be used, e.g., planetary gearbox, adjustable-speed drive, continuously variable transmission, among others.

With continued reference to FIG. 1, a focusing assembly 32 is shown comprising two sails 24 that are configured to channel wind into a focused stream of air directed at a prescribed target region 26 (FIGS. 2 and 3) on each of the rotors 12. The target region is preferably confined to an exposed half (½) of the rotor to induce rotation of the rotor, more preferably the target region is an exposed quarter (¼) of the surface area of the rotor. In the exemplary embodiment, the target region 26 on the rotor is preferably disposed about the peripheral equatorial region of the body. As the focused stream strikes the target region it will induce the rotor to spin. In the exemplary embodiment, the sails 24 effectively focus the captured air such that substantial portion of the channeled wind as exits the focusing assembly is confined only to strike the target region 26. The sails substantially accelerate the wind to high wind speeds as it reaches a rotor 12, even in comparatively low wind environments.

Figure 8:
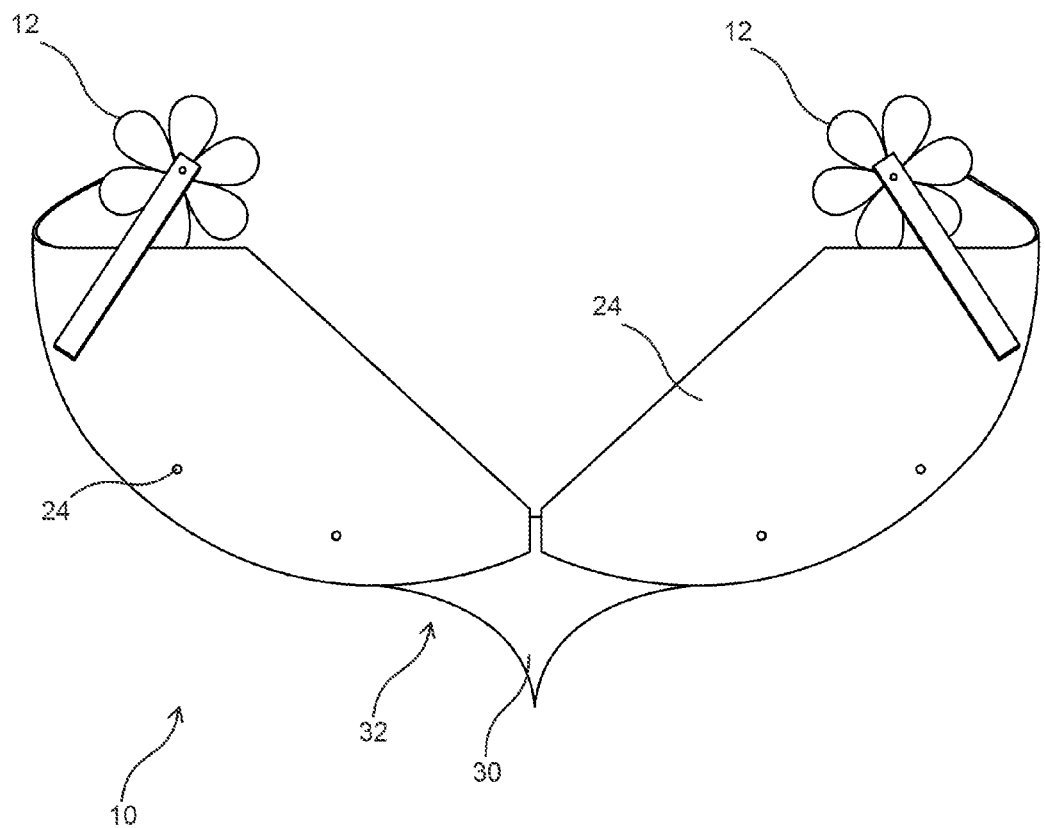
FIG. 8 is a top view of the sails depicted in FIG. 1.

The focusing assembly 32 includes a center mast 28. The sails 24 are mounted to a center mast 28 and terminate proximate to the spaced-apart rotors 12. More particularly, the sails are mounted such a manner such that they can be adjusted to accommodate wind conditions, as needed. As seen in FIG. 7, the sails are angled rearward relative to the center mast 28 which can include a splitter 30 (not shown in FIG. 1) to further focus will air flow into the sails. As seen in FIG. 8, the sails provide a curved profile to capture a high volume of air, preferably taking advantage of the Venturi effect. The focusing assembly 32 can further include a shield 34 disposed about the rotor 12 to further facilitate focusing the air stream upon the target region 26 of the rotor.

Figure 10:
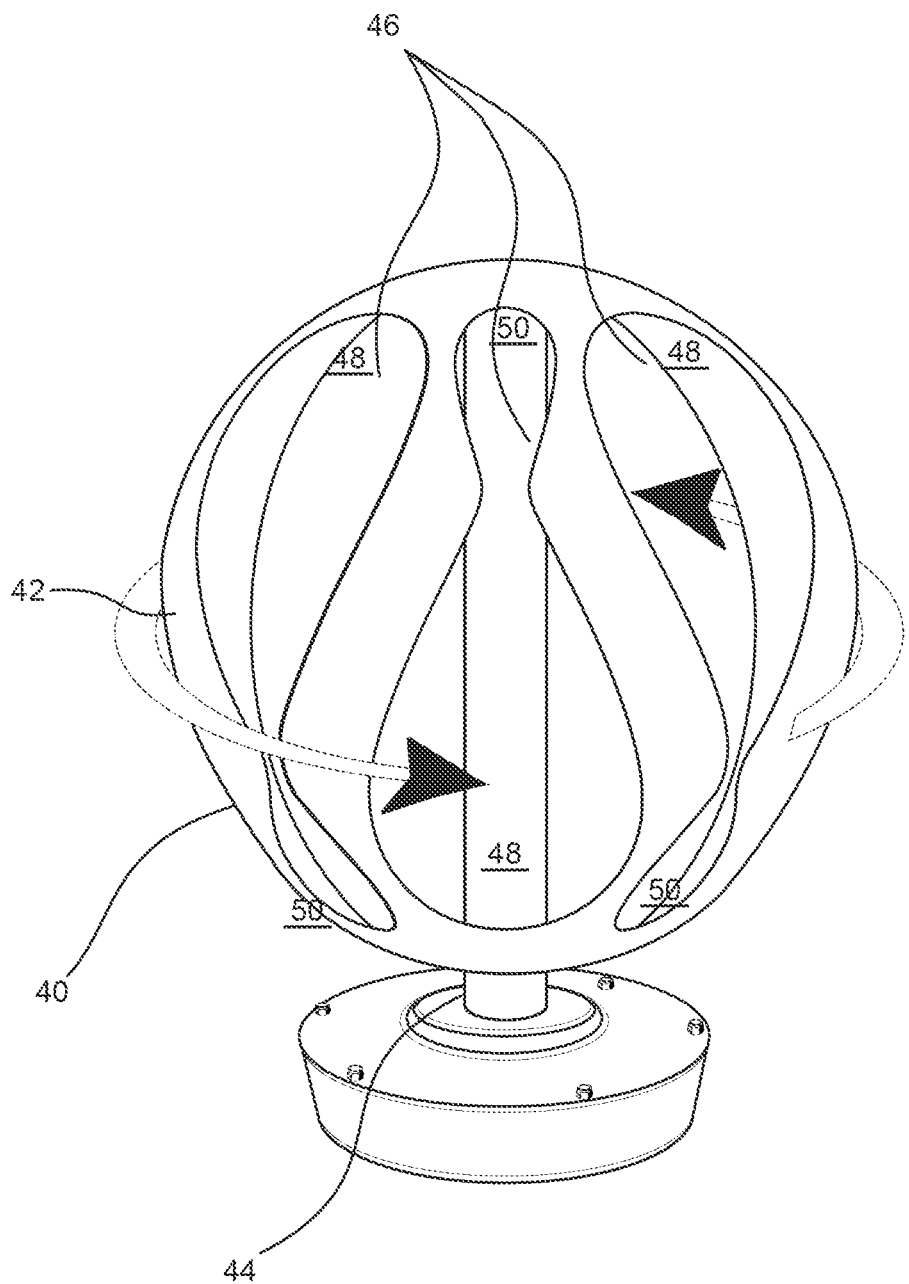
FIG. 10 is a perspective view of another embodiment of a rotor for a turbine assembly in accordance with the invention.

With reference to FIG. 10, another embodiment of a rotor 40 is depicted. The rotor 40 includes a body 42 having a hollow configuration. The rotor is mounted to a shaft 44 such that the rotor spins about a single axis of rotation. The rotor includes a plurality of recesses 46 disposed about the perimeter of the body. Each of the recesses taper from wide end 48 to a narrow end 50. In the exemplary embodiment, each of the recesses includes a central axis generally aligned with the axis of rotation of the rotor. Adjacent recesses are disposed in alternating orientations such that a wide end 48 of the first recess is positioned adjacent to a narrow end 50 of the second recess.

Figure 9:
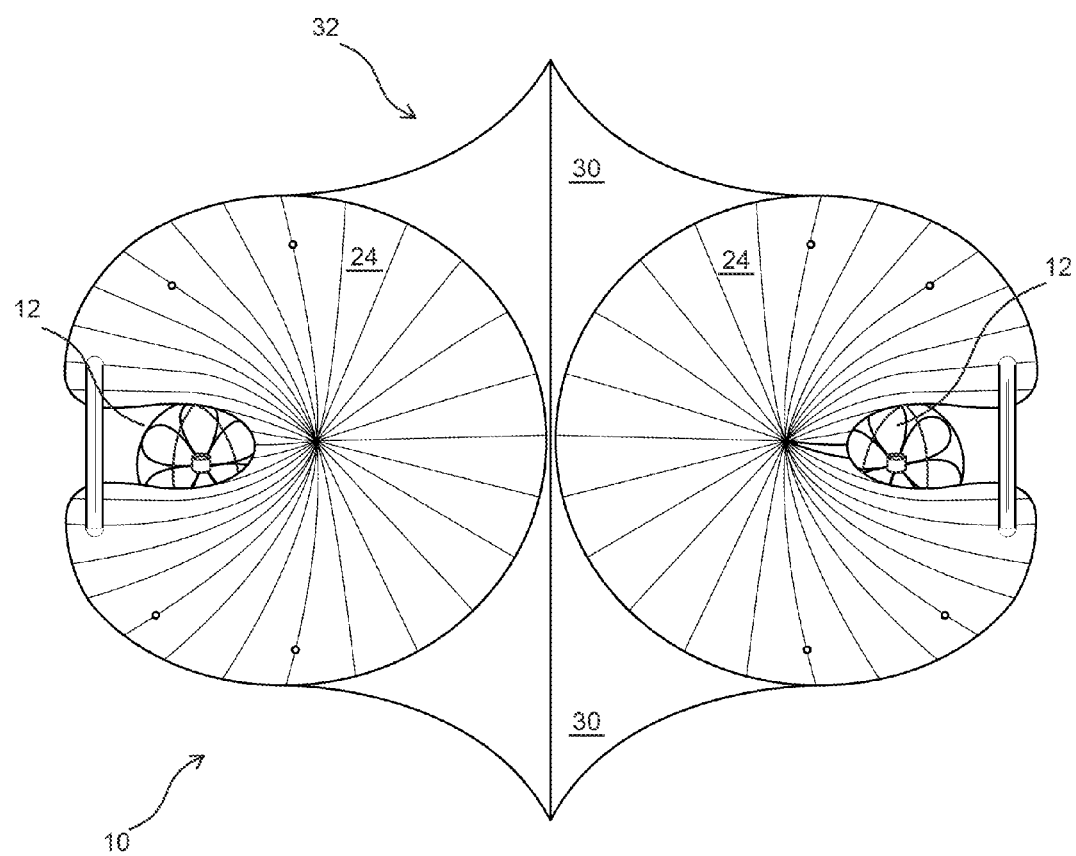
FIG. 9 is a front perspective view of the sails depicted in FIG. 1.
Figure 11:
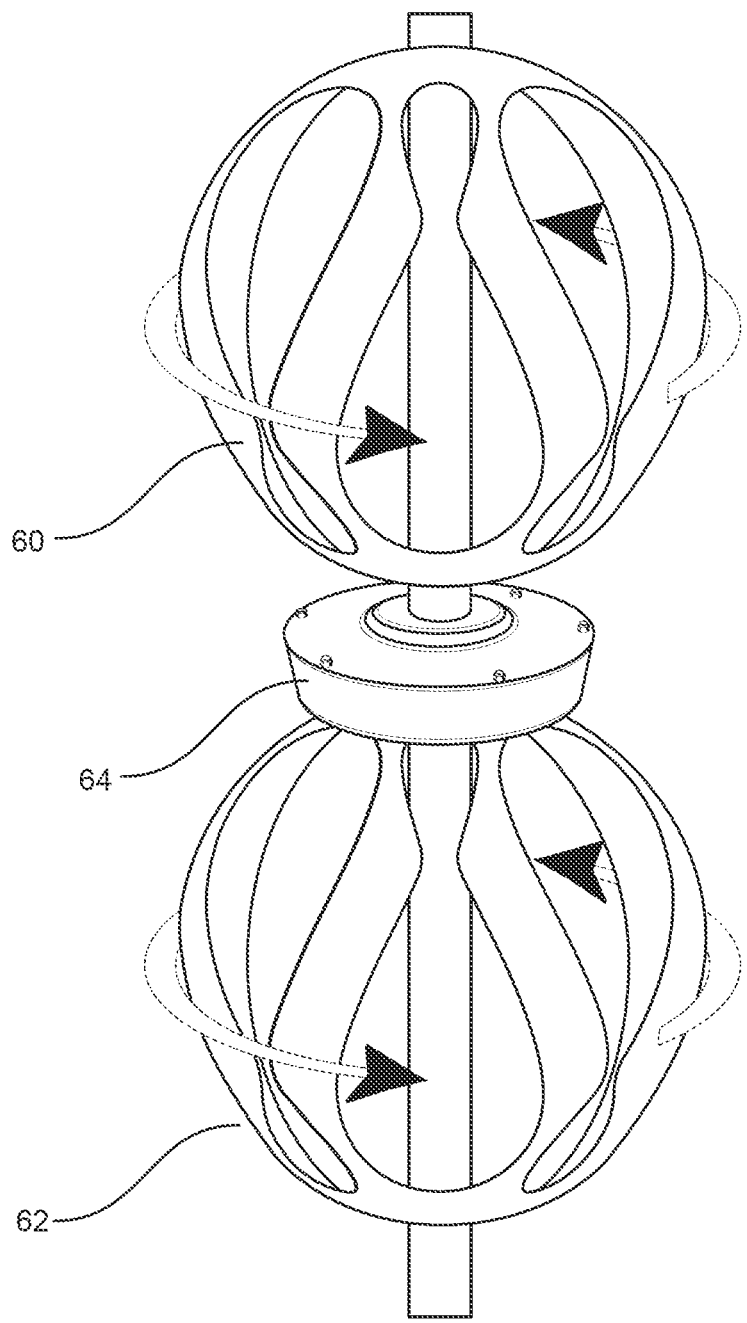
FIG. 11 is a perspective view of a yet another embodiment of a rotor for a turbine assembly in accordance with the invention.

With reference now to FIG. 11, a pair of rotors 60, 62 can be coupled to a single turbine 64 for electrical generation. In the exemplary embodiment, the rotors are similar to rotor 40 of FIG. 9; however, any other rotor configuration can be used in such applications.

Figure 12:
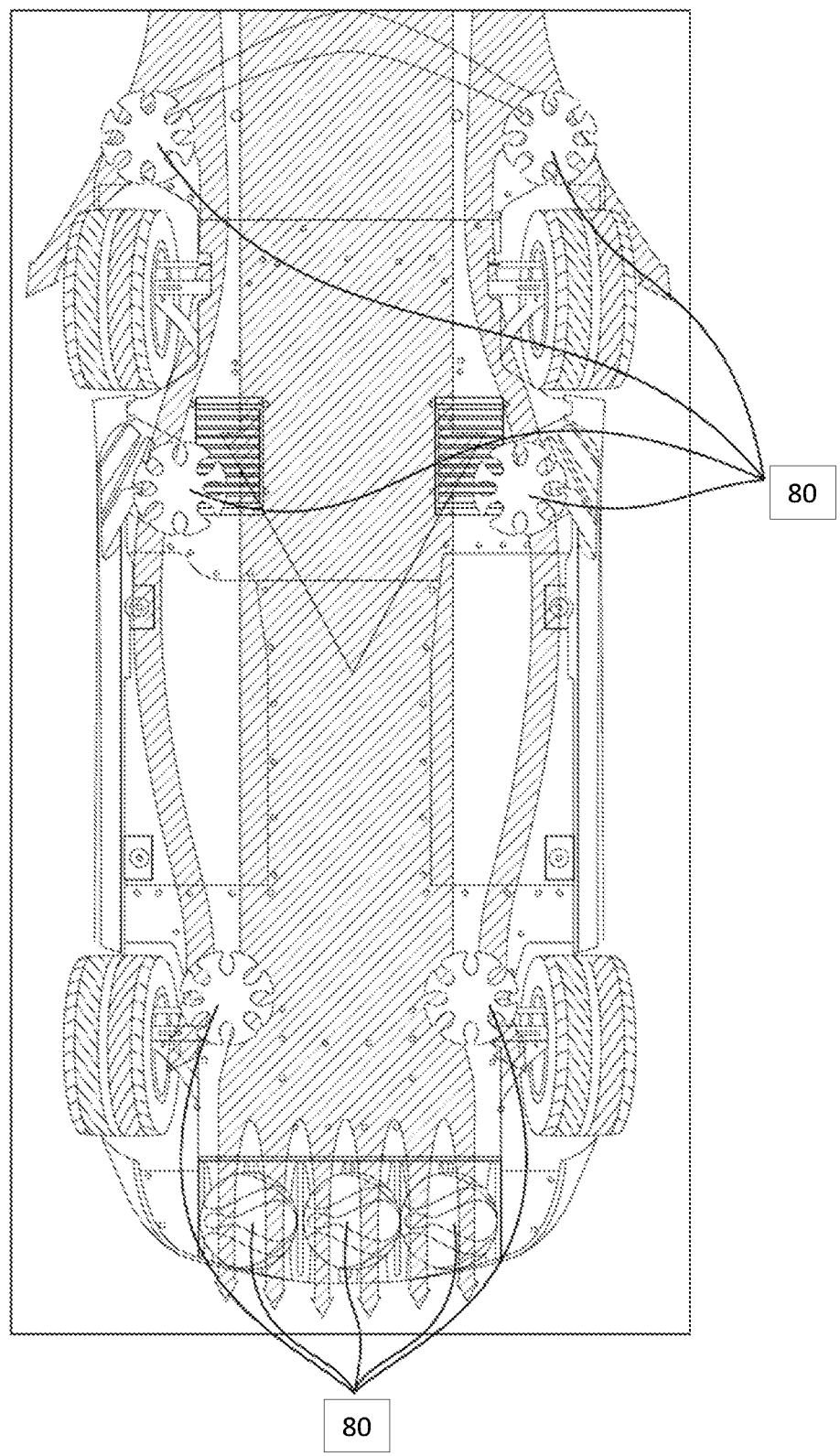
FIG. 12 is a bottom view of a vehicle having a turbine assemblies in accordance with the invention disposed at selected locations on the vehicle.

Rotors configured in accordance with the present invention can be used in numerous different types of applications. For example, as shown in FIG. 12, turbine assemblies 70 can be disposed and oriented at prescribed locations on a vehicle to take advantage of airflow while the vehicle is traveling. In this manner, the vehicle body 72 can serve as a focusing assembly to direct the focusing of air to target regions of the rotors 74 of the turbine assemblies 70.

Figure 13:
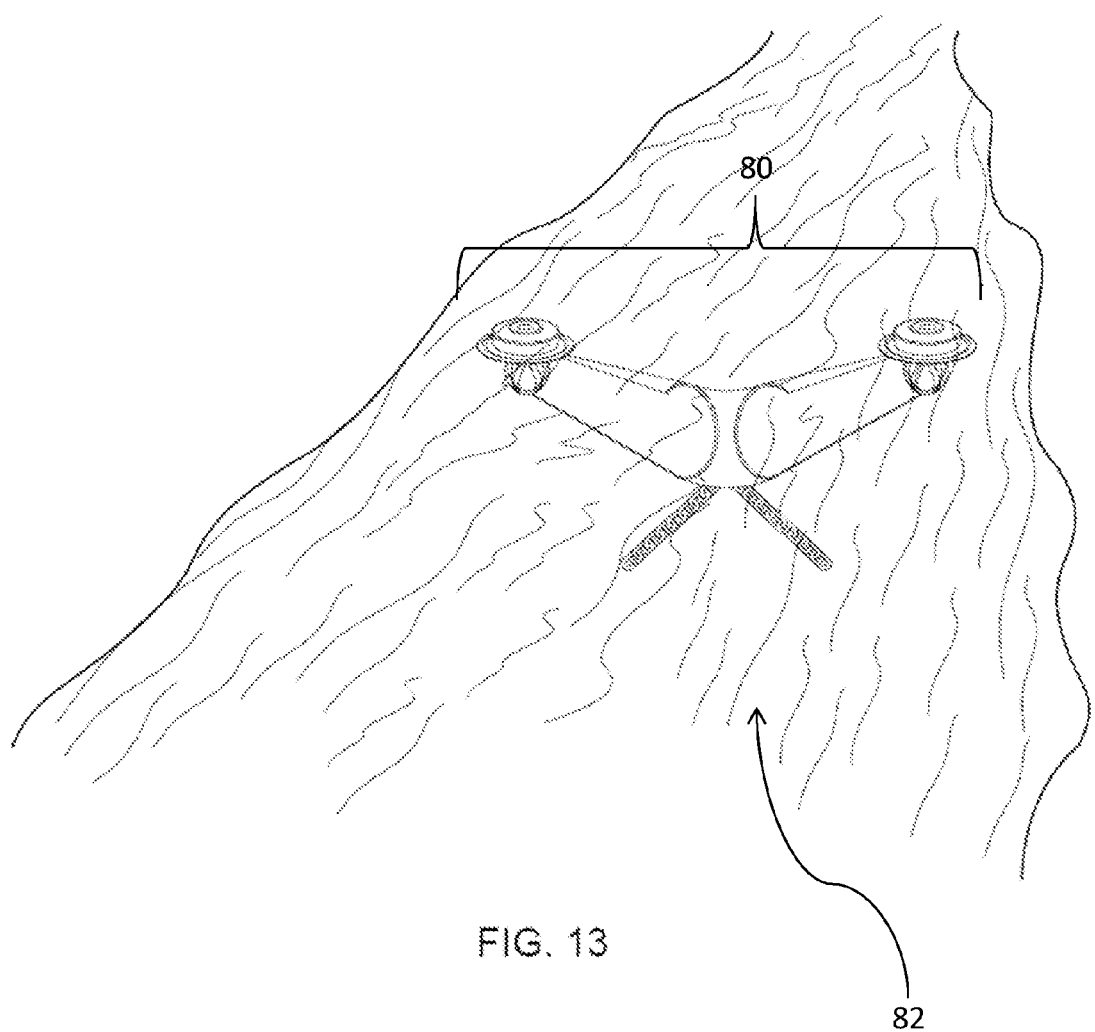
FIG. 13 is a perspective view of a turbine assemblies in accordance with the invention disposed in a body of water for hydroelectric generation.

As shown in FIG. 13, rotors can be used in various other fluid flow applications such as hydroelectric power generation, e.g., dual rotor assembly 80 anchored in place in moving water 82. A rotor can also be configured for use in fluid pump applications in which the rotor serves to move a volume of fluid.

It should be appreciated from the foregoing that the present invention provides a turbine assembly comprising a rotor that includes a plurality of recesses disposed in alternating orientations. A focusing assembly can be provided to direct a concentrated air stream to a target region of the rotor to cause the rotor to rotate or electrical generation.

Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:
1. A turbine assembly, comprising:
   a shaft defining an axis of rotation; and a rotor mounted to the shaft and having a spheroid body, the body defining a plurality of recess circumscribing the axis of rotation, each of the recesses having a wide end and a narrow end, the plurality of recesses disposed in the alternating orientations such that the wide ends and the narrow ends of the adjacent recesses are proximate to one another.

2. A turbine assembly as defined in claim 1, further comprising the focusing assembly configured to channel fluid flow to a target region of the rotor to cause the rotor to spin about the axis of rotation.

3. A turbine assembly as defined in claim 2, wherein the target region is a peripheral equatorial area of the body.

4. A turbine assembly as defined in claim 2, the focusing assembly further including a shield disposed about the rotor.

5. A turbine assembly as defined in claim 1, wherein the plurality of recesses each has a generally frusto-conic shape.

6. A turbine assembly as defined in claim 5, wherein the recesses have an exponential taper.

7. A turbine assembly as defined in claim 6, wherein the exponential taper is such that equidistant cross-sections each has a diameter that increases by a prescribed factor relative to the preceding cross-section.

8. A turbine assembly as defined in claim 7, wherein the prescribed factor is the golden ratio.

9. A turbine assembly, comprising:
a shaft defining an axis of rotation;
a rotor mounted to the shaft and having a spheroid body, the body defining a plurality of recess circumscribing the axis of rotation, each of the recesses having a wide end and a narrow end, the plurality of recesses disposed in the alternating orientations such that the wide ends and the narrow ends of the adjacent recesses are proximate to one another, the rotor having a target region disposed in a peripheral equatorial area of the body, the plurality of recesses comprising at least eight recesses; and
a focusing assembly configured to channel fluid flow to the target region of the rotor.

10. A turbine assembly as defined in claim 9, wherein the plurality of recesses each has a generally frusto-conic shape.

11. A turbine assembly as defined in claim 10, wherein the recesses have an exponential taper.

12. A turbine assembly as defined in claim 11, wherein the exponential taper is such that equidistant cross-sections each has a diameter that increases by a prescribed factor relative to the preceding cross-section.

13. A turbine assembly as defined in claim 12, wherein the prescribed factor is the golden ratio.

14. A turbine assembly as defined in claim 9, further comprising a second rotor coupled to the shaft.

15. A turbine assembly, comprising:
a shaft defining an axis of rotation;
a rotor mounted to the shaft and having a spheroid body, the body defining a plurality of recess circumscribing the axis of rotation, each of the recesses having a wide end and a narrow end, the plurality of recesses disposed in the alternating orientations such that the wide ends and the narrow ends of the adjacent recesses are proximate to one another, the rotor having a target region confined within one half of the body, the plurality of recesses comprising at least eight recesses; and
a focusing assembly configured to channel fluid flow to the target region of the rotor.

16. A turbine assembly as defined in claim 15, wherein the target region is confined with one quarter of the body.

* * * * *